United States Patent [19]
Kaercher, Jr. et al.

[11] 3,913,682
[45] Oct. 21, 1975

[54] CONTROLS FOR A SOD CUTTER BLADE

[75] Inventors: William C. Kaercher, Jr., Minneapolis, Minn.; Donald G. Haffner, Greendale; Anthony J. Saiia, South Milwaukee, both of Wis.

[73] Assignee: Jacobsen Manufacturing Company, Racine, Wis.

[22] Filed: Apr. 1, 1974

[21] Appl. No.: 456,849

[52] U.S. Cl. .................. 172/20; 172/101; 172/125
[51] Int. Cl.² .................. A01B 45/04; A01B 33/00
[58] Field of Search .......... 172/20, 19, 21, 22, 101, 172/125

[56] References Cited
UNITED STATES PATENTS

| | | | |
|---|---|---|---|
| 2,942,674 | 6/1960 | Ditter et al. | 172/20 |
| 3,738,431 | 6/1973 | Gennow | 172/20 |
| 3,803,659 | 4/1974 | Sawatsky | 172/101 X |
| 3,807,505 | 4/1974 | Nunes | 172/20 |

*Primary Examiner*—Stephen C. Pellegrino
*Attorney, Agent, or Firm*—Arthur J. Hansmann

[57] ABSTRACT

Controls for a sod cutter blade wherein a sod cutter machine has a blade movably mounted thereon and a linkage is connected to the blade for moving it into and out of the sod being cut into desired lengths of strips. The blade linkage is disposed in a parallelogram arrangement, and a motor is on the machine and actuates the blade, and the machine includes a measuring wheel connected to an electric system which in turn is connected to the motor for cyclically driving the blade. A control mechanism, in the form of a cam and a cam follower and a pivot arm, is interposed between the linkage and the motor control switch, such that the motor and the linkage make one cycle with each cut, and the entire mechanism is re-set to a starting position without ending in a dead center or other undesirable position.

13 Claims, 7 Drawing Figures

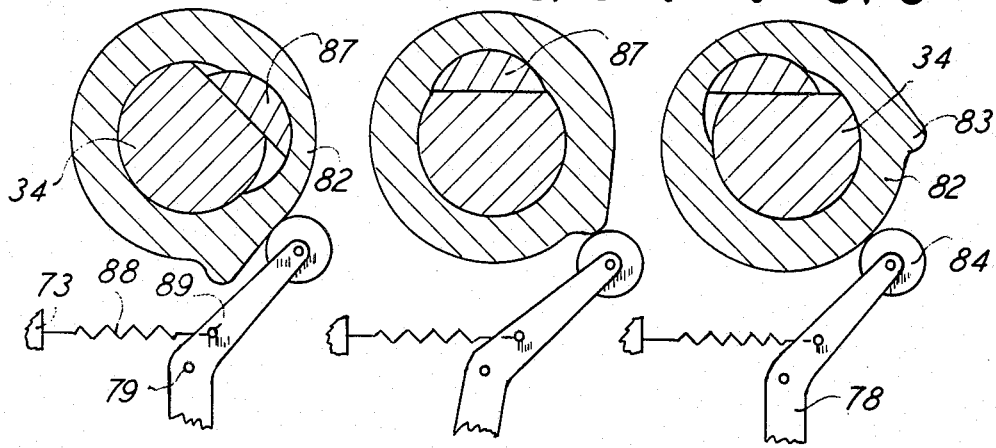
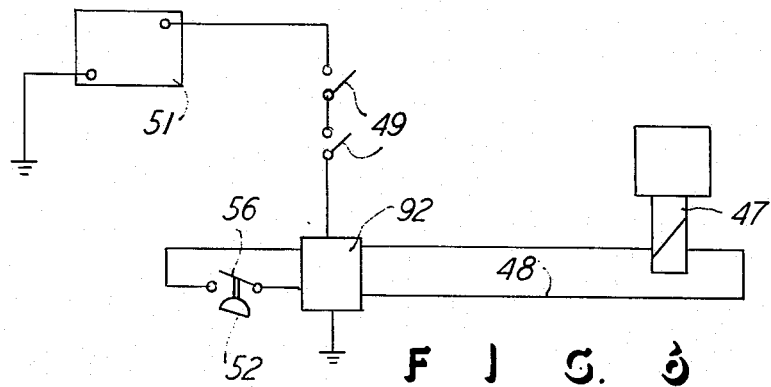
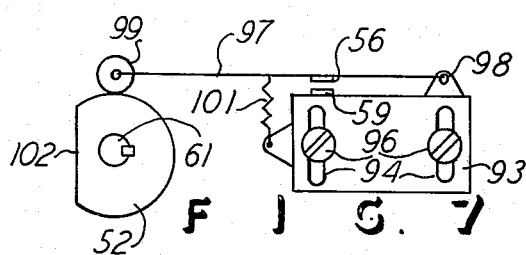

CONTROLS FOR A SOD CUTTER BLADE

This invention relates to controls for a sod cutter blade, wherein the blade is movably mounted on a sod cutter machine which traverses the ground, and the blade is controlled by means of a motor which acts in a cyclical manner so that one complete and accurate movement of the blade is accomplished with each cut-off of the strip of sod.

BACKGROUND OF THE INVENTION

Sod cutting machines and blade mountings and controls are already known in the art. Some examples of the prior art machines are found in U.S. Pat. Nos. 2,206,264 and 2,942,674 and 3,738,431 and U.S. Pat. No. Re. 24,432. These prior art sod cutting machines consist of mechanism which mounts the severing blade and which controls the blade by mechanical linkage or the like, and the blade is therefore moved up and down by cumbersome mechanism which is not commonly adjustable and which cannot be accurately controlled to move the blade for the desired accurate cut-off of lengths of sod.

Accordingly, it is a general object of the present invention to provide controls for a sod cutter blade wherein the blade can be accurately and quickly positioned in its cutting and its retracted positions, and wherein the mounting or controls for the blade can be adjusted in an accurate and easy manner so that the cutting action of the blade can be governed according to the traversed position of the machine over the ground. With this particular invention, the length of the strip of sod can be cut to a desired length, and the entire blade mounting and controls are such that the blade will enter ground with a minimum of resistance to the machine itself in its forward progress, and the blade can also be utilized for initiating the roll-up of the sod, if desired.

Still another object of this invention is to provide controls for a sod cutter blade wherein the blade will not operate unless switches are set in their operative positions, and thus there is a safety feature in the blade controls.

Still another object of this invention is to provide a control and a mounting for a sod cutter blade wherein the blade is securely mounted on the machine and wherein it can be accurately and rapidly positioned to its cutting position and to the retracted position, all with a minimum of strain on the machine and also while permitting the adjustment of the controls for movement of the blade according to the ground-traversed position of the machine itself.

Other objects and advantages will become apparent upon reading the following description in light of the accompanying drawings.

BRIEF DESCRIPTION OF THE DRAWINGS

FIGS. 3, 4 and 5 are sectional views of progressive positions of portions of the controls for the blade.

FIG. 6 is a schematic view of some of the components of the controls for the blade.

FIG. 7 shows a variation of certain parts.

DETAILED DESCRIPTION OF THE PREFERRED EMBODIMENT

Figure 1:
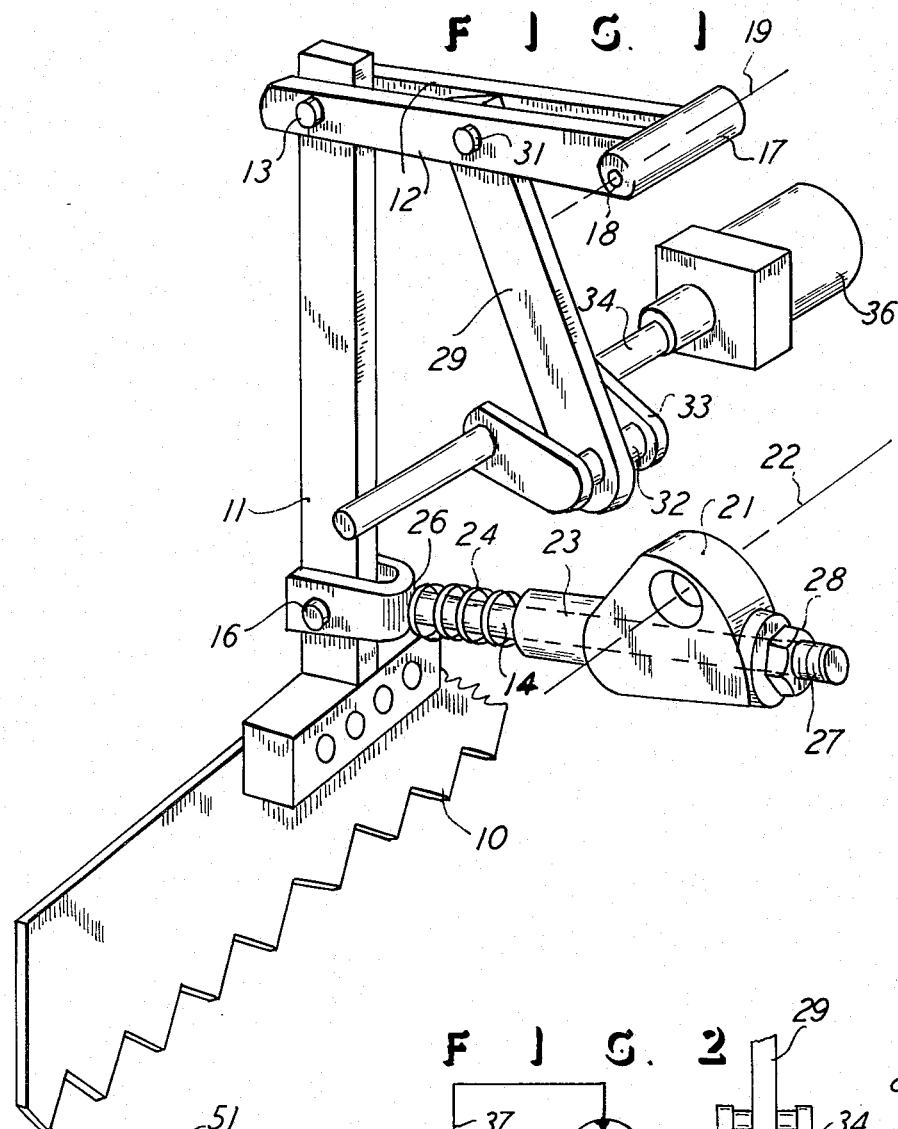
FIG. 1 is a perspective view of some of the controls for the blade, and also showing a fragment of the blade itself.

FIG. 1 shows a portion of a sod cutter machine, and it specifically shows a fragment of a sod cutting blade 10 which is uprightly disposed and which is moved in an upward direction under the control of a bar 11 which is attached to the blade 10. An upper pair of links 12 are pivotally connected to the upper end of the bar 11 by means of a pin 13, and a lower rod 14 is pivotally connected to the lower end of the bar 11 by a pin 16. The upper links 12 have an affixed sleeve 17 which has an opening 18 which could receive a pin which is not shown but which would of course be mounted in a fixed position on the frame of the sod cutter machine and on the axis line designated 19, as will be understood by one skilled in the art. Also, the lower rod 14 is slidably disposed in a support pivot block 21 which is pivotally mounted on a fixed axis designated 22 and on the sod cutter machine frame. The rod 14 is slidable in the block 21, and a spacer 23 also slidably receives the rod 14 and abuts a compression spring 24 to position the spring 24 between the spacer 23 and the end of a clevis 26 which actually engages the pin 16, as shown. Thus the rod 14 can slide through the spacer 23 and the block 21, accordingly to the swing of the blade 10 and its support arm 11 about the upper pin 13. The rod rear end 27 is threaded and has a nut 28 which abuts the block 21 when the spring 24 is at its full extent, and thus the rod 27 is limited in sliding movement to the left, as viewed in FIG. 1. However, the rod 14 can slide to the right, as viewed in FIG. 1, and as mentioned above, and then the spring 24 becomes compressed and the rod 14 merely extends somewhat to the rear of the block 21, and this position is achieved when the blade 10 is lowered into the sod being severed and the machine is moving forward, compressing the spring 24 in that forward movement.

Therefore, the mounting described in connection with the blade 10 is of a parallelogram nature defined by the arm 11 and the upper links 12 and the lower rod 14, with the latter two being pivotal about their respective pivot axes 19 and 22, as will be understood and as mentioned.

To control the up-and-down movement of the blade 10, a link 29 is pivoted to the arms 12 by the pin 31, and the other end of the link 29 is connected to the crank pin 32 which is on the crank arms 33 supported on the crank shaft 34. Thus, the shaft 34 extends from a motor 36, and thus the crank action of movement of the link 29 is achieved with each revolution of the motor 36, as described latter. With that single revolution or cyclical action, the blade 10 is caused to make one complete cycle of the up-and-down movement for severing the sod, as desired.

Figure 2:
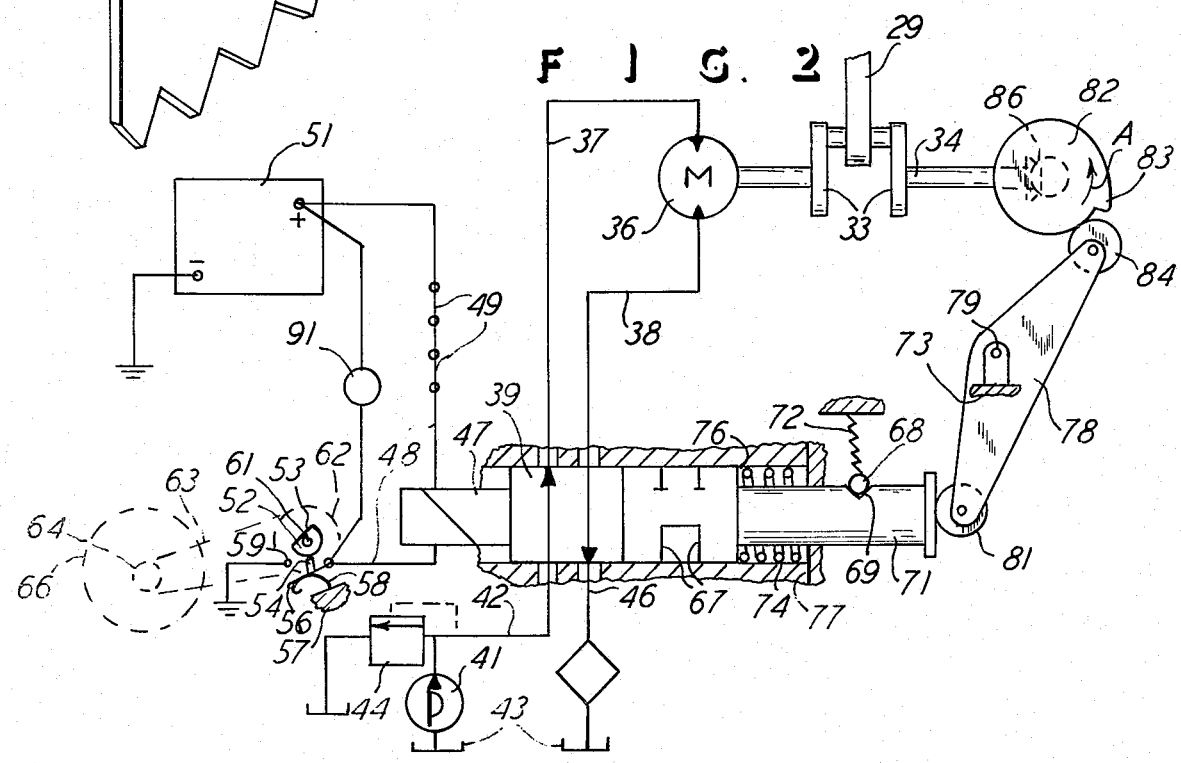
FIG. 2 is a diagrammatic view of the components of the controls for the blade.

FIG. 2 shows the arrangement of the components of this invention, and it will be here noted that the link 29 is fragmentarily shown and is mounted on the crank shaft 34, as described in connection with FIG. 1. Also, motor 36 is shown in FIG. 2, and the diagramatic arrangement is such that it will be understood that the crank shaft 34 extends from the motor 36 and it may be the actual shaft of the motor 36 or another rotatably mounted shaft, as desired. Considering the motor 36 to be a hydraulic motor, a fluid inlet line 37 and a fluid outlet line 38 are shown to be connected to the motor 36, and these lines extend to and connect with a hydraulic valve designated 39, and the arrows on the lines 37 and 38 show the direction of fluid flow at the valve 39. Thus, fluid under pressure is supplied by the pump designated 41 which is connected through a fluid line 42 to the inlet of the valve 39. A hydraulic reservoir designated 43 is shown to be in fluid supply communication with the pump 41, and a check valve 44 may also be provided, in the manner indicated in FIG. 2. Also, a fluid return line 46 is connected to the valve 39 and extends to the reservoir 43, as indicated.

A conventional electric solenoid type of member 47 is shown connected to the hydraulic valve 39 for controlling the spool of the latter, in the conventional manner. Thus, electric wires 48 are shown connected to the solenoid 47, and one of the wires 48 has safety switches 49 therealong and connects to the battery designated 51. The other wire 48 connects to a cam type of switch designated 52, and this switch has the usual flat portion 53 and the usual abutment finger 54 rides on the surface of the cam and controls the position of the switch portion 56. Thus, the machine frame designated 57 supports a spring 58 which abuts the switch portion 56 to yieldingly urge the portion 56 into position with the switch contact 59. However, the cam 52 periodically opens the switch 56 by virtue of the configuration of the cam 52, such as shown in the position in FIG. 2 when abutment 54 is being depressed by the cam 52 to open the switch 56. However, when the cam flat portion 53 is adjacent the finger 54, then the switch 56 will close with the switch contact 59, and this will energize the solenoid 47, all in the conventional manner and similar to the arrangement of contact points in a conventional automobile.

The cam 52 is mounted on a shaft 61 to be rotated by the shaft 61 which in turn is rotated by a sprocket shown in dotted lines and designated 62. The sprocket 62 engages a sprocket chain 63 which is on a sprocket 64 driven by a ground traversing wheel 66, and these aforementioned parts are shown in dotted in FIG. 2. That is, the ground traversing mechanism described has the ground engaging wheel 66 rotating with the advance of the sod cutting machine, and that rotation in turn rotates the cam shaft 61 and thus the cam 52 for opening and closing the switch 56. In turn, the solenoid 47 is energized and thus the hydraulic valve spool is shifted. These arrangements will be understood by one skilled in the art, and it will be further seen and understood that the cam type of switch described would be in the closed position, rather than the open position shown, when the hydraulic valve spool 39 is in the position for flow communicating the pump 41 with the motor 36 and thereby rotating the motor 36 for one revolution, as mentioned later. In this arrangement, the valve spool 39 is a shiftable member since it responds to the energizing of the solenoid 47, as described. Of course when the shiftable member 39 is to the left from the position shown in FIG. 2, then the spool is presenting dead head passageways 67 to the lines 42 and 46 so that the pump is not effective on the motor 36 but is simply discharging back to the reservoir 43, if the pump is even running. That is, depending upon the position of the shiftable member 39, the motor 36 may or may not be energized at the moment, and thus the blade 10 may or may not be moving at that moment.

As previously mentioned, when the motor 36 moves through one revolution by virtue of the action just described, then the blade 10 is caused to move down and sever the sod and to then move back to its retracted position. It is now of concern to retain the blade in its retracted position until the sod cutting machine has advanced to a position where the next cut is to be made by the blade 10, so that the strip of sod will be formed in the desired length. To accomplish this, the shiftable member or spool 39 is held in the position shown in FIG. 2 by means of a retainer 68 which is shown to be a ball received in a detent 69 in the spool shaft 71. The retainer 68 is under the influence of a compression spring 72 which urges the retainer 68 downwardly into the detent 69, and the spring 72 is mounted on the machine frame shown at 73. Also, a compression spring 74 is disposed between a shoulder 76 of the spool 39 and a wall 77 of the machine frame 73, and thus the spool 39 is urged to the left, as viewed in FIG. 2. The spool 39 is therefore held in the position where it will feed the motor 36, and that is the position seen in FIG. 2, but it is subsequently desired that the spool 39 be moved out of the position shown so that the motor 36 will immediately stop and the blade controls will be positioned to their retracted position.

To accomplish the retraction, a control mechanism in the form of a pivot arm 78 is mounted on the frame 73 and on a pivot pin 79 on the frame. A roller 81 is shown to be in contact with the end of the spool shaft 71, and when the arm 78 pivots to cause the roller 81 to the left and against the shaft 71, the retainer 68 is relieved from its position in the detent 69 and the spool 39 shifts to its inoperative position previously described and thus the motor 36 will no longer be operating. To accomplish the pivoting of the arm 78, the control mechanism shown includes a cam 82 which includes a trip member or portion 83 in rolling contact with a wheel 84 on one end of the arm 78, as shown in FIGS. 2 through 5. The cam 82 rotates in the direction of the arrow designated "A" in FIG. 2, and thus the arm 78 is pivoted with each revolution of the motor 36, since the shaft 34 rotates in unison with the motor 36 and the cam 82 does likewise and it is indicated that gears 86 show one diagramatic connection between the shaft 34 and the cam 82 but this may also be a direct or non-gear connection but because of the angle shown in the diagrammatic view in FIG. 2, the bevel gears 86 are indicated.

Thus, each time the cam off-set or trip portion 83 rolls over the wheel 84, the arm 78 will pivot to disengage the retainer 68 and shift the hydraulic spool 39 to the inoperative position, as described.

To insure that the controls will return to their full inoperative position where the blade 10 is raised, there is a lost motion or over-ride arrangement between the cam 82 and its control or mounting shaft which may be designated 34, for the reason mentioned. Thus FIGS. 3, 4 and 5 show successive positions of the trip member or cam 82, and it will here be understood that the FIG. 5 position is comparable to that position shown in FIG. 2. Then, when the cam 82 rotates to the position shown in FIG. 3, the motor would have accomplished essentially one revolution and one cutting action would therefore have been achieved by the blade 10. At that time it is desired that the motor 36 be stopped, by the positioning of the shiftable member 39 as described, and it is then also desirable that the entire mechanism or control be returned to the inoperative position. To accomplish this return to the inoperative position, the cam 82 is allowed to rotate beyond the rotation of the shaft 34, and this is achieved by a sliding key 87 disposed between the shaft 34 and the cam 82 in the manner shown in FIGS. 3, 4 and 5. Thus, in the movement between FIGS. 3 and 4, the key 87 has slid relative to the shaft 34 to allow the cam 82 to rotate to the position shown in FIG. 4, and such degree of rotation is essentially slightly more than that achieved by the shaft 34 itself. Additionally, FIG. 5 shows then that the cam 82 continues its counterclockwise direction of rotation while the shaft 34 does not rotate, and thus the cam enlargement or finger 83 moves beyond the roller 84 and therefore the pivot arm 78 can move back to the position shown basically in FIG. 2 and thereby permit the spool 36 to move to the right to the position shown in FIG. 2, and thus the entire operating cycle can be repeated. Without the cam override just described, the hydraulic valve spool 39 would not be permitted to move back to the right to the position shown in FIG. 2 and thereby energize the motor 36. FIGS. 3, 4 and 5 also show a tension spring 88 attached to the arm 78 at the pin 89 and attached to the frame 73, as shown, for urging the arm 78 in the counterclockwise direction about the pin 79. Thus, in the FIG. 3 position, the motor shaft 34 is driving the cam 82 during the cutting action. In FIG. 4, the shaft 34 has stopped rotation but the cam 82 has overrun the shaft 34, by inertia of the cam 82, and the key 87 is thus positioned as shown in FIG. 4. FIG. 5 then shows that the cam 82 continues to rotate beyond the shaft 34 until the key 87 again locks the two members against rotation. Finally, when the motor 36 is next operated, its shaft 34 is rapidly accelerated and once again the inertia of the cam 82 causes it to have relative rotation with the shaft 34 and in this instance lags that rotation of the shaft 34 and then the key 87 locks the two in the relative position shown in FIG. 3, for a repeat of the cycle described.

In order to adjust or control the length of sod, the action of the blade 10 is controlled, and this may be by changing the size of the cam 52 on its supporting and driving shaft 61 so that different size cams 52 may be utilized and thus the action of the switch 56 will be different with each revolution described. Since the cam 52 and its switch 56 would normally be enclosed in a case, a means are provided to enable the operator to know the position of the parts and to actually set the mechanism in a desired position. Thus, an electric lamp 91 is connected in the electric circuit and to one side of the switch 56, as shown in FIG. 2. Therefore, when the switch 56 is closed, the lamp 91 will be energized and will be apparent to the operator. For instance, if the first strip of sod in a row is to begin from an existing cut and square edge, the operator positions the machine with the cut-off blade 10 directly over that edge, and he then rotates the measuring wheel 66 in a forward direction until the switch 56 is closed and the lamp 91 is energized and apparent to him. The machine will now measure the first strip of sod to the correct length from that existing square edge.

If the operator wishes to begin the first row of sod by firing the cut-off blade, he then rotates the measuring wheel backwards until the light 91 first comes on, and he then continues to rotate slowly backwards until the light just goes off. The cut-off blade 10 will then trigger as soon as the machine is operated in the forward direction. Of course the arrangement of a sod cutter machine with the ground engaging and measuring wheel 66 as described herein is more fully described in the patents referred to at the outset of this document, and the utilization of a measuring wheel is generally known to one skilled in the art and need not be further described herein.

The disclosure thus includes the ground traversing mechanism which is the wheel 66 and its attending parts, and it includes the measuring control which is the automobile type of cam switch 52 and its parts, and it includes the shiftable member which is the hydraulic spool 39 and its attending parts, and it includes the control mechanism which is the pivot arm 78 and the cam 82 and their attending parts.

FIG. 6 shows another arrangement for controlling the energizing of the solenoid 47, and it will be seen here that the battery 51 again provides the power through the safety switches 49 and to the cam switch 56 operated by the cam 52, as described. However, in the schematic diagram shown in FIG. 6, an electric time-delay relay 92 is connected between the cam switch 56 and the solenoid 47 for timing the energizing of the solenoid 47 by means of a conventional relay 92, and in this instance the action of the relay 92 is such that it is independent of the dwell time of the switch 56, and opening the switch 56 will automatically re-set the time delay relay 92 which is of a conventional and well-known nature.

In both instances of the electric control of FIG. 2 and FIG. 6, the switch 56 and its attending mechanical and electrical parts comprise a triggering mechanism including the cam 52, and including the lamp 91 where it is used and utilized as described.

FIG. 7 shows a variation for adjusting the timing of the points 56 and 59. A support block 93 has screw slots 94 for receiving screws 96 to set the block 93 and the contact point 59 on the block 93, relative to the contact point 56 on the arm 97 which is pivotally mounted at 98 on the block 93. A roller 99 is on the end of the arm 97 and is in rolling contact with the cam 52 which is shown keyed onto the shaft 61. A tension spring 101 keeps the roller 99 in rolling contact with the cam 52 and at least toward the cam flat 102 when the latter is adjacent the roller 99, all to control the opening and closing of the contact points 56 and 59. Thus, by increasing or decreasing the gap between the contact points 56 and 59, the length of time that the solenoid 47 is energized is controlled and adjustable for timing and controlling the cycles of cutting.

What is claimed is:

1. Controls for a sod cutter blade, comprising an electrical power source, a cutter blade, a linkage operatively connected to said cutter blade for moving said cutter blade into and out of sod, a motor and a driving means therefor operatively connected with said linkage for actuating said linkage in a cyclical manner, a shiftable motor control operatively connected with said motor for controlling the operation of said motor in accordance with the shifted position of said shiftable motor control member, motor control means operatively associated with said linkage and said shiftable motor control member for shifting said shiftable motor control member in response to the position of said linkage to thereby control said motor to effect the cyclical movement of said linkage and said cutter blade, energizable means operatively connected to said shiftable motor control member, and measuring control means operatively connected with said energizable means and including a ground-traversing mechanism engageable with the ground and having a member operative in response to the distance engaged on the ground, for operatively connecting said power source with said energizable means in accordance with the ground traversed by the sod cutter.

2. The controls for a sod cutter blade, as claimed in claim 1, wherein said motor and said shiftable motor control member are hydraulic elements, and wherein said measuring control means includes an electric switch.

3. The controls for a sod cutter blade, as claimed in claim 1, wherein said motor control means includes a trip member operative with each cycle of said motor and being operatively disposed between said linkage and said motor control means for causing said motor control means to move to shift said shiftable motor control member.

4. The controls for a sod cutter blade, as claimed in claim 1, wherein said motor is a hydraulic motor and wherein said shiftable motor control member includes a solenoid operated hydraulic valve and wherein said measuring control means includes an electric switch electrically connected to the solenoid.

5. The controls for a sod cutter blade, as claimed in claim 1, including a retainer operatively associated with said shiftable motor control member and engagable therewith for releasably holding the latter in an operative position, and said motor control means, through its shifting of said shiftable member, being effective relative to said retainer for releasing said shiftable motor control member from said retainer.

6. The controls for a sod cutter blade, as claimed in claim 5, wherein said motor control means includes a trip member operative with each cycle of said motor being operatively disposed between said linkage and said motor control means for causing said motor control means to move to shift said shiftable motor control member.

7. The controls for a sod cutter blade, as claimed in claim 1, wherein said ground-traversing mechanism includes a triggering mechanism, for the cutting movement of said cutter blade, and an adjustable member included in said triggering mechanism and being responsive to the ground traversed and being operatively associated with said power source and being adjustable for altering the timing of the cutting movement of said cutter blade relative to the ground traversed by the sod cutter.

8. The controls for a sod cutter blade, as claimed in claim 7, wherein said triggering mechanism is an electric switch and includes a cam removably assembled in said triggering mechanism to be replaceable for altering the cutter blade timing.

9. The controls for a sod cutter blade, as claimed in claim 7, wherein said triggering mechanism is an electric switch and including an indicator lamp electrically connected with said electric switch for indicating when said switch is open and closed.

10. The controls for a sod cutter blade, as claimed in claim 1, wherein said motor control means includes a rotary cam operatively associated with said motor for rotation with each operation of said motor, and an over-ride connection included in said motor control means and operatively associated between said cam and said shiftable motor control member and being movable relative to said cam for effecting re-setting of said cam with each operation thereof.

11. The controls for a sod cutter blade, as claimed in claim 10, wherein said motor has a shaft which is rotatable as a part of said motor, said rotary cam being rotatably associated with said shaft, said over-ride connection including a drive key interposed between said shaft and said cam and being loose therebetween for limited movement of said cam relative to said shaft, to thereby have said cam rotate after said shaft has stopped rotating, a rise on said cam, said motor control means including an element in contact with said cam rise to be actuated by said cam rise and in turn actuate said shiftable motor control member.

12. The controls for a sod cutter blade, as claimed in claim 1, wherein said measuring control means includes an electric switch and said shiftable motor control member includes a solenoid electrically connected with said switch, and wherein said shiftable motor control member includes a hydraulic valve operatively connected to said solenoid, and including a retainer operatively associated with said valve and being releasable therefrom for releasably holding said valve in a set position to cycle the cutting movement of said blade.

13. The controls for a sod cutter blade, as claimed in claim 1, wherein said measuring control means includes an electric switch and wherein said shiftable motor control member includes a solenoid electrically connected to said switch, and including an electric time-delay relay electrically connected between said switch and said solenoid.

* * * * *